United States Patent [19]

Neri

[11] Patent Number: 4,612,445

[45] Date of Patent: Sep. 16, 1986

[54] SYSTEM FOR MONITORING THE OPERATION OF INPUT CIRCUITS TO A CENTRAL CONTROL AND MONITORING UNIT FOR MACHINES AND/OR DEVICES USABLE IN PRODUCTION AND/OR PRODUCT PACKAGING LINES

[75] Inventor: Armando Neri, Bologna, Italy

[73] Assignee: G.D. Societa Per Azioni, Bologna, Italy

[21] Appl. No.: 566,368

[22] Filed: Dec. 28, 1983

[30] Foreign Application Priority Data

Feb. 15, 1983 [IT] Italy ................................ 3335 A/83

[51] Int. Cl.⁴ ............................................ G08B 29/00
[52] U.S. Cl. .................................... 250/551; 340/514
[58] Field of Search ............... 250/551, 562; 364/552, 364/579; 340/500, 506, 514

[56] References Cited

U.S. PATENT DOCUMENTS

| | | | |
|---|---|---|---|
| 4,068,105 | 1/1978 | Jain et al. | 340/514 |
| 4,275,307 | 6/1981 | Struger et al. | 250/551 |
| 4,415,884 | 11/1983 | Delin et al. | 340/500 |
| 4,464,605 | 8/1984 | Ford, Jr. et al. | 250/551 |

Primary Examiner—David C. Nelms
Assistant Examiner—Michael Messinger
Attorney, Agent, or Firm—Frost & Jacobs

[57] ABSTRACT

A system for controlling and monitoring a manufacturing or packaging line. The system includes a plurality of input circuits of identical configuration, each being able to provide either: (a) an integrator for eliminating disturbing signals fed to the input circuit, (b) a high pass filter for passing AC signals to the input circuit, or (c) a rectifier for rectifying AC signals fed to the input circuit. Each of the circuit configurations includes a plurality of terminals arranged for connection to devices for controlling or monitoring the manufacturing or packaging line. The connections between the terminals and the devices are selected in accordance with the type of device employed. The system also includes a central control unit connected to the input circuits and a detection circuit connected to the input circuits to detect defects in the operation of the input circuit. The detection circuit also includes a system for sending test signals to the input circuits, wherein the test signals are operable to cause changes in the logic level of the signals sent by the output circuits to the central unit. The detection circuit also includes a system for detecting the changes of the logic level and discriminating whether or not the changes are the consequence of sending the test signals.

5 Claims, 9 Drawing Figures

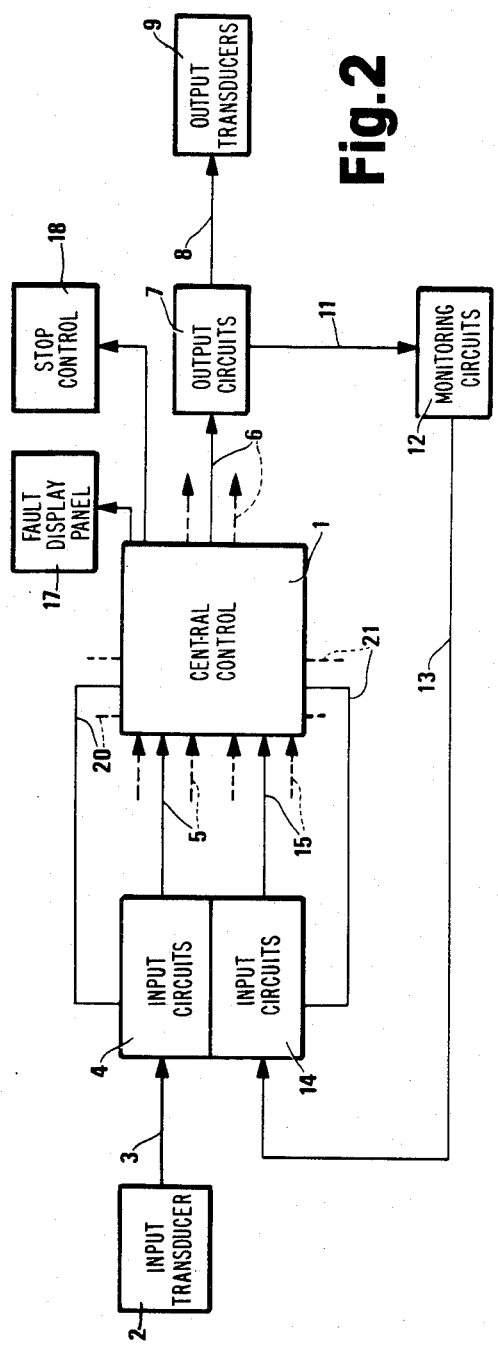
Fig. 2
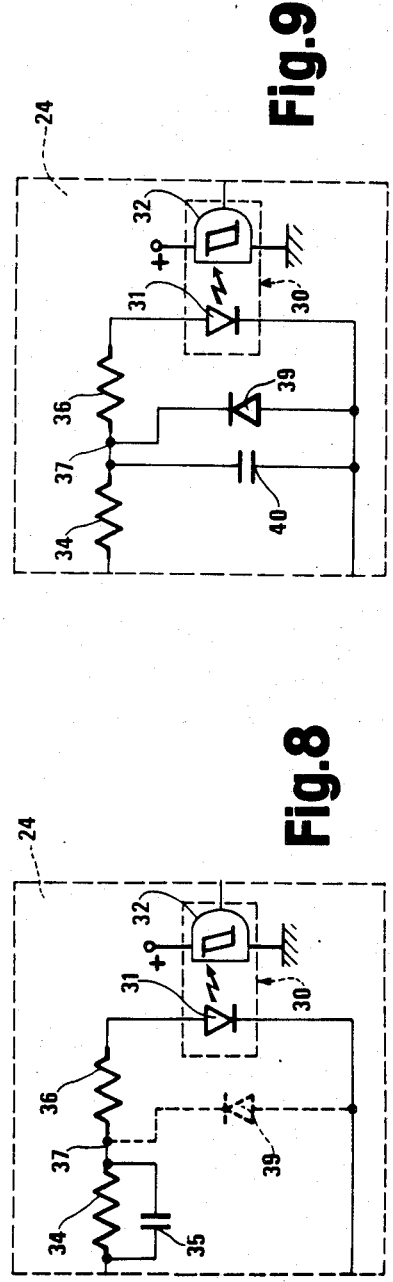
Fig. 9
Fig. 8

SYSTEM FOR MONITORING THE OPERATION OF INPUT CIRCUITS TO A CENTRAL CONTROL AND MONITORING UNIT FOR MACHINES AND/OR DEVICES USABLE IN PRODUCTION AND/OR PRODUCT PACKAGING LINES

BACKGROUND OF THE INVENTION

The present invention relates to a system for monitoring the operation of input circuits to a central control and monitoring unit for machines and/or devices usable in production and/or product packaging lines, for example production lines for making cigarettes and/or for packaging packets of cigarettes. Such lines can, for example, include cigarette-making machines, filter fitting machines, packaging machines, cellophane wrapping machines, carton-making machines or parcel-forming machines.

As is known, such individual machines or production lines are controlled by a central control and monitoring unit which, in dependence on determined signals emitted by input transducers, determines the appropriate operating instants of the various output transducers, which can also belong to different machines in the same line. Such a central control and command unit receives input signals from input transducers by means of respective input circuits.

These input transducers can include switching devices (for example microswitches or proximity sensors), devices which provide signals at relatively high frequency, of the order of several tens of kHz, (for example signals coming from synchronization systems), and devices which provide alternating voltage signals having a frequency of the order of several tens of Hz (for example signals coming from transformers).

Further, such central control and monitoring units also detect the action of the control at the output transducers, by means of associated monitoring circuits which are coupled to the central unit by means of respective input circuits.

SUMMARY OF THE INVENTION

The object of the present invention is to provide a system for monitoring the operation of all the various input circuits to such a central control and monitoring unit for machines and/or devices of the above specified type, which will have various advantages of economy of manufacture and reliability in use.

According to the present invention, there is provided a system for monitoring the operation of input circuits to a central control and monitoring unit for machines and/or devices usable in production and/or product packaging lines, characterised by the fact that it includes means for detecting possible defects in the operation of the input circuits, the means including associated control and detection means in the central unit connected to the input circuits, the input circuits being formed with a circuit configuration obtained from a single basic configuration and varied in dependence on the type of circuit connected by means of the input circuit to the central unit.

BRIEF DESCRIPTION OF THE DRAWINGS

For a better understanding of the present invention various embodiments will now be described by way of non limitative example, with reference to the attached drawings, in which:

FIG. 2 is a block diagram of individual components of the diagram of FIG. 1;

FIGS. 8 and 9 are electrical diagrams illustrating variations of another part of the basic circuit diagram of FIG. 3.

DETAILED DESCRIPTION OF THE INVENTION

Figure 1:
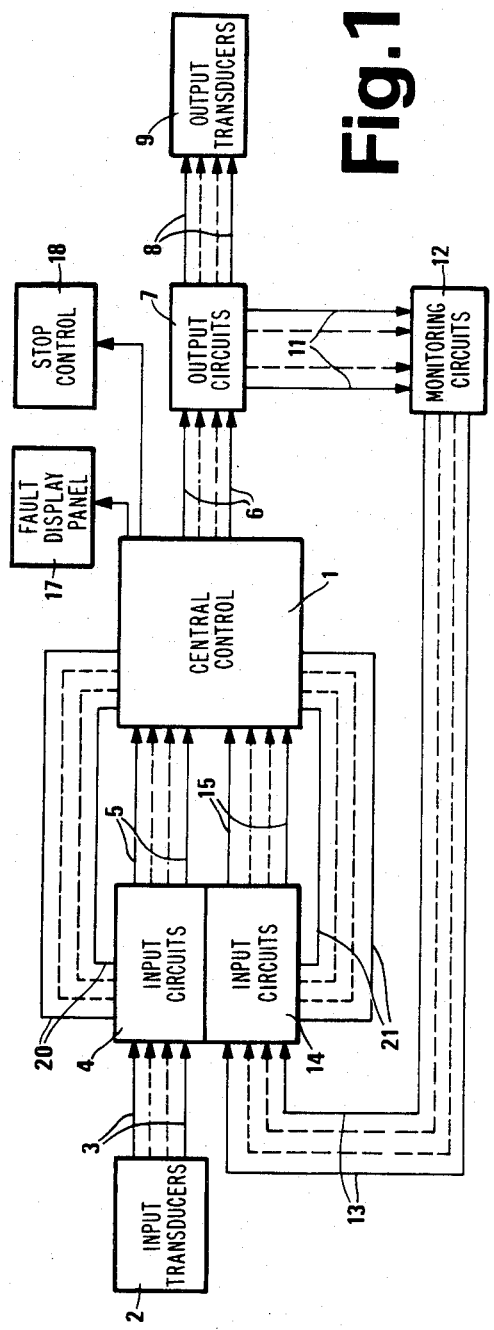
FIG. 1 is a block schematic diagram of the system for monitoring the operation of input circuits to a central control and monitoring unit, formed according to the present invention.

With reference to FIG. 1, the reference numeral 1 generally indicates a central control and monitoring unit for machines and/or devices usable in production and/or product packaging lines, in particular lines for the production and packaging of packets of cigarettes. As already indicated above, in a known configuration such lines include a plurality of input transducers 2 which are coupled by means of respective connections 3 to respective input circuits 4, which are connected by means of respective connections 5 to the central unit 1.

This central unit 1 is in turn connected by respective connections 6 to respective output circuits 7, which are connected by means of respective connections 8 to respective output transducers 9. The output circuits 7 are then respectively connected by means of connections or couplings 11 to respective monitoring circuits 12, which are connected by respective connections 13, to respective input circuits 14 connected, by respective connections 15, to the central unit 1.

To this central unit 1 there are then connected a fault display panel 17 and a block 18 for controlling the stopping of the machine or the line.

According to the present invention, the input circuits 4 and the input circuits 14 are connected to the central unit 1 by means of respective connections 20 and 21 for monitoring the operation of these input circuits 4 and 14 in a manner which will be described.

These input circuits 4 and 14 are made in the form of integrated circuits and grouped on boards which each include, for example, twenty two of them. As can be seen in FIG. 2, each input transducer 2 is connected by means of a connection 3 to a respective input circuit 4, which is connected by means of a connection 5 to the unit 1. There are thus the same number of input circuits 4 as there are input transducers 2, and similarly there are the same number of connections 20 between the unit 1 and the input circuits 4.

The number of output circuits 7 is equal to that of the output transducers 9. There are the same number of monitoring circuits 12 and input circuits 14 as there are transducers and each circuit 14 is connected to the unit 1 by means of a connection 15 and a connection 21.

Figure 3:
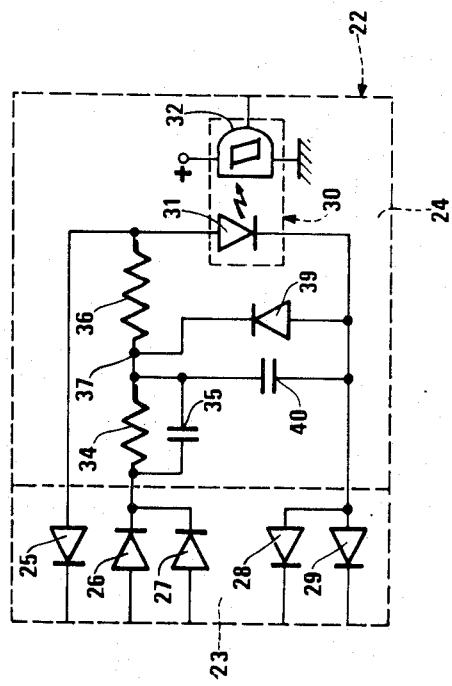
FIG. 3 is an electrical diagram of a basic circuit configuration formed according to the present invention.

As can be seen in FIG. 3, according to the present invention a basic circuit configuration 22 is provided for the input circuits 4 and 14, which can be slightly modified to adapt it to different types of input transducers 2 and control circuits 12 which are connected to it.

With reference to FIG. 3, this basic configuration 22 is sub-divided into two parts 23 and 24. The first part 23 comprises 5 diodes 25, 26, 27, 28 and 29, whilst the second part includes a final component 30 comprising photo-electric coupling means.

In particular, the final component 30 is constituted by a photo-diode 31 and a threshold photo-amplifier 32 with hysteresis, or known type, including for example a Schmitt trigger. The anodes of the diodes 26 and 27 are free for external connection, whilst their cathodes are connected in common to one end of a parallel connected pair unit comprising a resistor 34 and a capacitor 35, the other end of the pair unit being connected to a first end 37 of a resistor 36. The other end of the resistor 36 is connected to the anode of the photo-diode 31. The end 37 is also connected to the cathode of a diode 39 in parallel to which is connected a capacitor 40. The anode of the diode 39 and the capacitor 40 are connected to the cathode of the photo-diode 31. The anode of the diode 39 is also connected to the anodes of the diodes 28 and 29 the cathodes of which are free for external connection. Moreover, the anode of the photo-diode 31 is connected to the anode of the diode 25 the cathode of which is free for external connection. The photo-amplifier 32 has a supply between a positive voltage terminal and earth (ground), and an output free for external connection.

Figure 4:
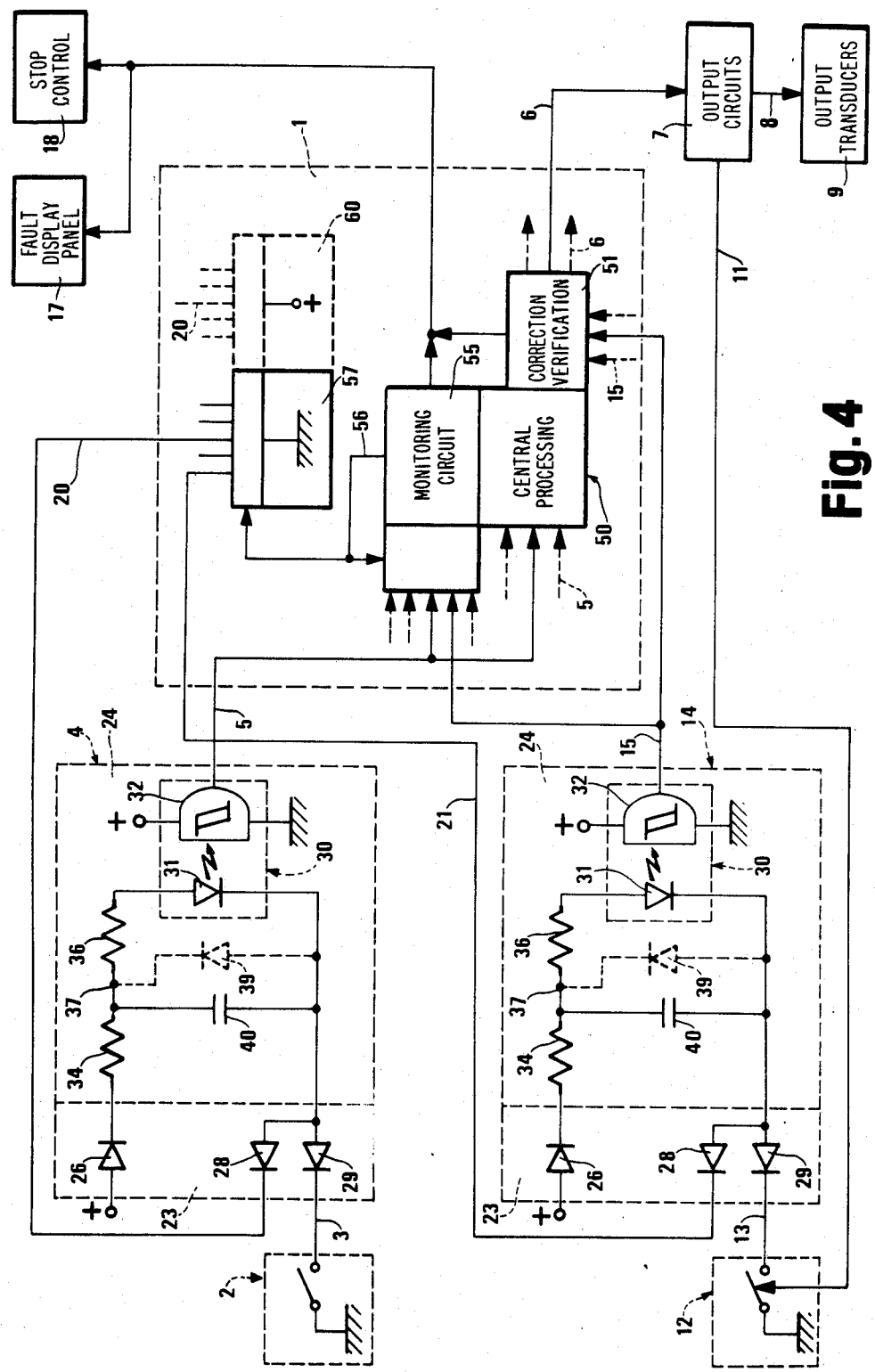
FIG. 4 is an electrical and block diagram of several component parts of the operation monitoring system of FIG. 1.

In FIG. 4 there is illustrated a first circuit configuration of input circuits 4 and 14 on the supposition that both the input transducer 2 and the control circuit 12 operate as switching devices of normally open type with connection to earth (ground). In this case, the part 23 of the basic circuit configuration 22 will include only diodes 26, 28 and 29 and the part 24 will have only resistors 34 and 36 and capacitor 40. In this way the arrangement of the resistor 34 and capacitor 40 as an integrator circuit is able to eliminate signals which would disturb the photo-diode 31 due, for example, to contact bounce upon opening or closing of the switch. The diode 39 can conveniently be connected in paralled with the capacitor 40. The connection 3 from the transducers 2 is thus connected to the cathode of the diode 29, whilst the anode of the diode 26 is connected to a positive voltage supply terminal.

The connections for the input circuit 14 are made in a similar manner.

The output connection 5 of the input circuit 4 is then connected to a central processing block 50 within the unit 1. This block 50 is operable to provide, by means of a respective connection 6, a signal to an output circuit 7 for actuating a transducer 9 when convenient. The output connection 15 of the input circuit 14 is, on the other hand, connected to a second part 51 of the processor block 50 operable to verify the correct operation of the output circuit 7.

The function of the part 51 of the block 50 is in fact that of comparing a control signal sent by it, by means of the connection 6, to an output transducer 9, with the signal received from the connection 15. If an operating defect is detected, the part 51 sends a signal to the fault display panel 17 and to the stop unit 18.

According to the present invention, the central block 50 of the unit 1 includes a block 55 for monitoring the operation of the input circuits 4 and 14. All the input circuits, including the circuits 4 and 14 of FIG. 4 are connected, by respective connections 5 or 15, to the block 55. The electrical connection of the input circuits to the block 55 takes place selectively under the control of a signal 56 emitted by the block 55, itself. The same signal 56 also selectively controls the connection of the diodes 28 of the various input circuits with a block 57. More precisely, the function of the block 57 is that of selectively determining, under the control of the signal 56, the earth (ground) connection of the cathodes of the diodes 28.

The operation of the input circuit monitoring system, formed according to the present invention, is as follows.

Considering that the monitoring is effected by the central control and monitoring unit 1 at pre-determined intervals or even at the beginning of an operating cycle, it is first of all supposed that monitoring of the operation of the circuit 4 of FIG. 4 is to be effected.

To this end the block 55 sends a signal 56, which has the effect of connecting the cathode of the diode 28 to earth via the block 57, and the output of the photo-amplifier 32 to the input of the block 55 itself. In the event of correct operation of the input 34 the grounding of the cathode of the diode 28 causes current to pass through the photo-diode 31 and therefore this passes from an extinguished condition to an illuminated condition. Consequently, the signal present on the connection 5 is subjected to a change of logic level, the block 55, which is able to discriminate test signals of short duration from signals of greater duration deriving from an effective actuation of the transducer 2. Additionally, block 55 detects the correct operating condition of the input circuit 4. On the other hand, if there is a fault in the input circuit 4, the signal 56 sent from the block 55 does not have the effect of causing an output signal from the photo-amplifier 32 and thus a change of logic level on the connection 5. In these conditions the block 55 itself emits a signal for the fault indicator panel 17 and for the block 18 to stop the machine.

After monitoring the circuit 4, the block 55 can then effect monitoring of the operation of another input circuit. If the new input circuit to be monitored is, for example, the circuit 14 illustrated in the lower part of FIG. 4 the grounding of the cathode of the diode 28 is controlled by the block 57 by means of the signal 56, and the output of the photo-amplifier 32 of the circuit 14 is connected to the input of the block 55. If the signal from the connection 15 is received, this verifies the correct operation of the input circuit 14.

On the other hand, if there is a fault in the input circuit 14, the output signal from the photo-amplifier 32 will not be present and a signal will be emitted from the block 55 for the fault indicator panel 17 and for the block 18 to stop the machine.

Figure 5:
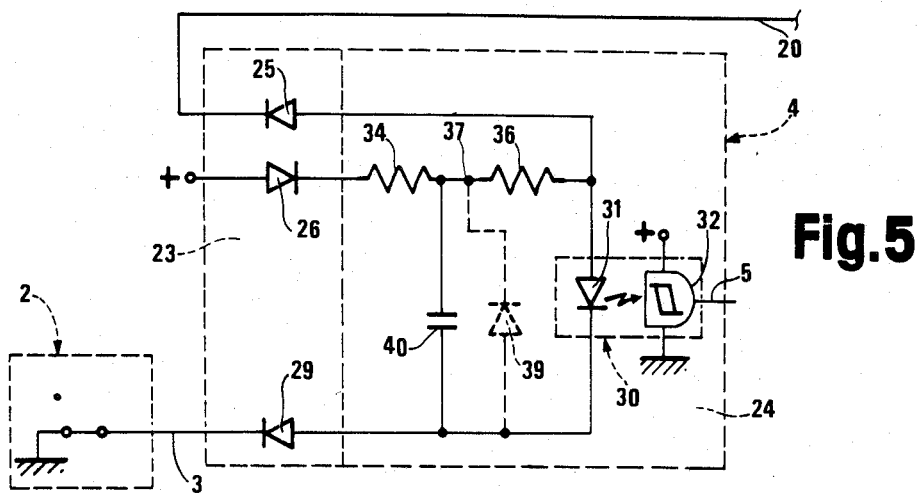
FIGS. 5, 6 and 7 are electrical diagrams illustrating variants of various parts of the diagram of FIG. 4.

As can be seen in FIG. 5, if the input transducer 2 and the monitoring circuit 12 operate the other way, as switch devices of the normally closed type, the diode 28 will be omitted from the part 23 and the diode 25 put into operation, the cathode of which is connected by means of a connection 20 to the selective input of the block 57 previously illustrated. In this case upon operation of the testing block 55 the cathode of the diode 25 is connected to earth (ground) and because the internal resistance of the diode 25 is less than the internal resistance of the photo-diode 31, this photo-diode 31, which was illuminated, will become extinguished. In the event of correct operation of the input circuit 4 this change of logic level of the connection signal 5 is detected by the testing block 55 as already described.

Figure 6:
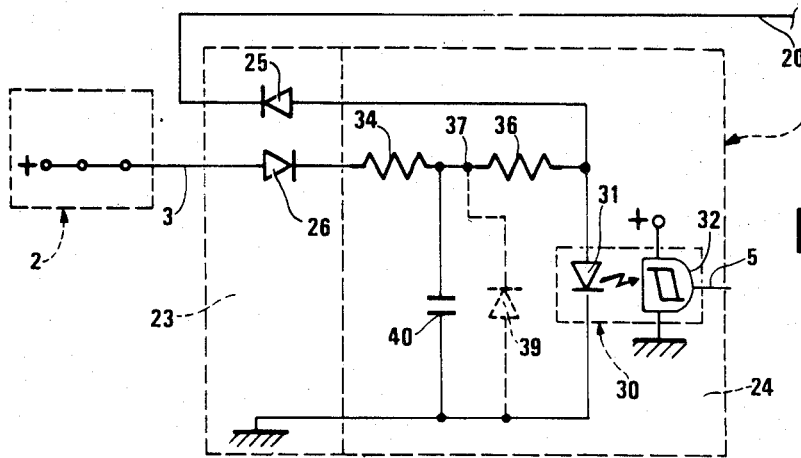

In FIG. 6, there is illustrated a further variant of the input transducer 2, which is provided with a configuration like a normally closed switch, connected, however, to a positive supply terminal rather than to earth. In this case, the connection 3 is connected to the anode of the diode 26 and the diode 29 is also omitted whilst the cathode of the photo-diode 31 is directly connected to earth. On the other hand, the cathode of the diode 25 is always connected selectively to the block 57. Also in this case, upon testing of the operation of the circuit 4, the photo-diode 31 passes from a condition of illumination to an extinguished condition.

Figure 7:
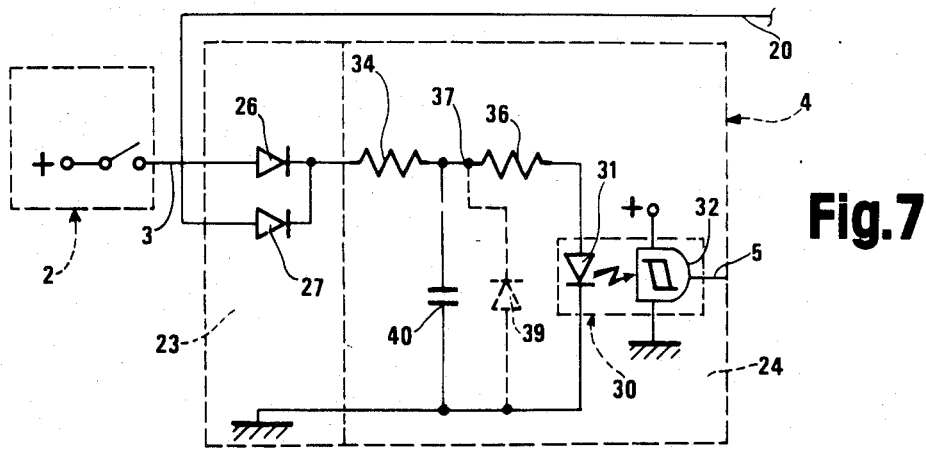

As is shown in FIG. 7, on the other hand, in a case in which the input transducer 2 corresponds to a switch device of the normally open type connected to a positive supply voltage terminal, the connector 3 is connected to the anode of the diode 26, the cathode of the photo-diode 31 is connected directly to earth, and the anode of the diode 26 is connected via a selective connection controlled by the signal 56 to a block 60 (indicated in broken outline in FIG. 4) rather than to the block 57; so that rather than determining a connection to earth, a connection to a positive voltage terminal is caused. In this case the testing block 55 causes illumination of the photo-diode 31, and the corresponding signal from the photo-amplifier 32 is detected by the test block 55.

On the other hand, in the case in which the input transducer 2 provides a signal of relatively high frequency, for example between 5 and 30 KHz, the basic circuit configuration 22 of FIG. 3, as far as part 24 is concerned, is modified by eliminating the capacitor 40, and the diode 39 (FIG. 8) can conveniently be retained. In this way the resistors 34 and 36 and the capacitor 35 form a filter which allows only signals of high frequency to pass thereby improving the response of the photo-diode 31.

Finally, in a case in which the input transducer 2 provides a signal at a frequency of several tens of Hz, for example 50 Hz, as can be seen in FIG. 9, the capacitor 35 is omitted from the part 24 with respect to the basic configuration of FIG. 3, so that a rectifier circuit for the alternating input voltage is provided, to apply a substantially continuous voltage to the photo-diode 31.

When the circuits of FIG. 8 or 9 are used, the part 23 of the circuit 22 can also be varied according to the configurations illustrated in FIGS. 4, 5, 6 and 7 in dependence on the type of connection of the transducer connected to the associated input circuit 4.

The described operation monitoring system of the present invention, therefore, has various advantages. First of all, the relative economy of manufacture in that, especially in the production of boards with a plurality of integrated circuits, the same basic circuit configuration for all of the various types of input circuit can be provided, as illustrated for example in FIG. 3.

This configuration as has been described, can be slightly varied in dependence on the type of transducer at the input 2 and of the type of monitoring circuit 12, connected by means of the simple connection comprising the various diodes 25, 26, 27, 28 and 29. In this way, the correct operation (or not) of the input circuit can be determined without altering the operation of the circuit itself for normal signals which come from the associated input transducers 2 or from the monitoring circuit 12. Further, these input circuits can be easily varied with respect to the basic configuration, as illustrated in FIGS. 4, 8 and 9, to adapt them to the type of input transducer connected thereto.

Finally, it is clear that the described embodiment of the system of the present invention can be modified and varied without departing from the scope of the invention itself. Among other things, the central unit 1 can be made differently, including for example a microprocessor, with a consequent functional adaptation of the internal blocks described.

I claim:

1. Apparatus for controlling and monitoring a manufacturing or packaging line, comprising:
   a plurality of input circuits have identical circuit configurations, each providing an operation selected from the group consisting of:
   (a) integrator means for eliminating disturbing signals fed to the input circuit,
   (b) a high pass filter for passing AC signals fed to the input circuit, and
   (c) rectifier means for rectifying AC signals fed to the input circuit,
   each of said circuit configurations having a plurality of terminals arranged for connection to devices for controlling or monitoring the manufacturing or packaging line, the connection between the terminals and devices being selectable in accordance with the type of operation employed;
   a central control unit connected to said input circuits; and
   means connected to said input circuits for detecting possible defects in the operation of said input circuits, wherein said detecting means includes means for sending test signals to said input circuits, said test signals being operable to cause changes of logic level in the signals sent by said input circuits to said central unit and wherein said detecting means further includes means for detecting said changes of logic level and for discriminating whether or not said changes are the result of sending said test signals.

2. Apparatus according to claim 1, wherein said input circuit is connected to said central control unit by photoelectric coupling means.

3. Apparatus according to claim 2, wherein said photoelectric coupling means includes a photodiode and a photo-amplifier having a threshold value and a hysteresis band.

4. Apparatus according to claim 1, wherein said plurality of terminals includes first and second terminals, first, second, third, fourth and fifth diodes each having an anode and a cathode, and
   output means having a first end and a second end, said first terminal being connected to the anode of said first diode, said second terminal being connected to the cathode of said second diode, the anode of said third diode being connected to said first end of said output means for passing a test signal thereto, the cathode of said fourth diode being connected to the cathode of said first diode, the anode of said fifth diode being connected to the anode of said second diode, wherein each of said input circuits are adapted for connection to the devices to said first and second terminals and for the connection of said defect detecting means to any one of the third, fourth and fifth diodes.

5. Apparatus according to claim 4 wherein each of said input circuits furthers includes a parallel unit comprising a resistor and a capacitor, the cathode of said first diode being connected to one end of said parallel units, the other end of said parallel unit being connected to a resistor in series with said first end of said output means, said second end of said output means being connected to the anode of said second diode, the other end of said parallel unit is connected to a capacitor disposed in parallel with said series, a sixth diode having an anode and a cathode, the anode of said sixth diode being connected to the anode of said second diode, the cathode of said sixth diode being connected to the other end of said parallel unit.

* * * * *